March 10, 1953  G. V. B. HERFORD ET AL  2,630,911
PROTECTION OF PACKAGES
Filed April 1, 1949

INVENTORS
Geoffrey Vernon Brooke Herford
& Thomas Alan Oxley
BY
ATTORNEY

Patented Mar. 10, 1953

2,630,911

UNITED STATES PATENT OFFICE 2,630,911

PROTECTION OF PACKAGES

Geoffrey Vernon Brooke Herford and Thomas Alan Oxley, Slough, England

Application April 1, 1949, Serial No. 85,022
In Great Britain April 9, 1948

12 Claims. (Cl. 206—10)

The purpose of the present invention is to protect the contents of packages from attack by insects.

It has already been proposed to impregnate paper or card used for wrapping and packaging, with an insecticide such as DDT but though insects may be killed as a result of their biting their way through the paper or cardboard, they frequently do not die until after they have got through, and what is still more important, the way is then open for other insects to follow through the same holes unscathed.

Many species of insects, for example *Tenebroides mauretanicus, Tribolium castaneum, Oryzaephilus surinamensis, Rhizopertha dominica* and *Dermestes maculatus* (vulpinus), tend to remain, and even congregate, in crevices which provide suitable contact with their bodies, and the present invention takes advantage of this tendency. Examples of materials presenting crevices of this character in which these insects like to congregate are crumpled or otherwise distorted paper, cellulose wadding, cotton wool, wood wool, and even loosely woven textiles.

According to the present invention a layer of elastic material of the above mentioned character is impregnated with an insecticide and is used as a protection for the contents of a package. The invention includes within its scope both the impregnated material as it could be supplied for use in packages or packaging, and packages and packaging containers provided with liners or wrappings of the impregnated material. For convenience the material may be held between sheets of a thin supporting material such as paper. The supporting material may be attached by adhesive or stitching which does not pass completely through the material so that there are no holes right through due to the stitching.

It is desirable that the insecticide should be one which is effective by contact; DDT, the gamma isomer of benzene hexachloride, and pyrethrum extract, are insecticides of this character. If a package has a lining of such impregnated material, the insects by sheltering or wandering in it according to their natural instincts will have time to pick up a lethal dose of insecticide and will thus be prevented from penetrating further into the package.

In the case of foodstuffs a particularly advantageous way of utilising the invention is to use the impregnated material as a liner to a large box or container holding a number of food packages. Used in this way, the insecticide does not come into contact with the food.

The invention will be further described with reference to the accompanying drawing which illustrates several examples. For the sake of clearness the figures are in somewhat diagrammatic form.

Figure 1:
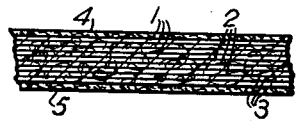
Figure 1 is a detail section of a material in accordance with the invention.

A particularly convenient form of material, shown in Figure 1, is cellulose wadding 1, 2, 3 in sheet form, supported on both surfaces by thin sheets of paper 4, 5. Experiment has shown that such a material consisting of a layer of eight or nine sheets thick and having only the middle three sheets 2 impregnated with a suitable concentration of DDT, constitutes an effective insect-proof liner for use as outlined above. A suitable concentration for use in this way is one to two per cent by weight of the impregnated layers. The complete material, i. e. eight or nine sheets of cellulose wadding and two cover layers of thin paper when compressed will have a thickness of $\frac{1}{12}$ to $\frac{1}{10}$ of an inch.

If a food package is wrapped in material of this kind in such a way that all edges overlap by several inches but are not sealed, it is found that insects do not usually penetrate the overlap although theoretically they are able to do so without coming in contact with insecticide.

Occasionally, in tests, an insect will penetrate the overlap and in order to prevent this one of the outer sheets of the cellulose wadding may be impregnated with insecticide. In order to prevent insecticide from coming in contact with the contents of the package the sheet impregnated should be that which is outermost when the contents are wrapped.

Figure 2:
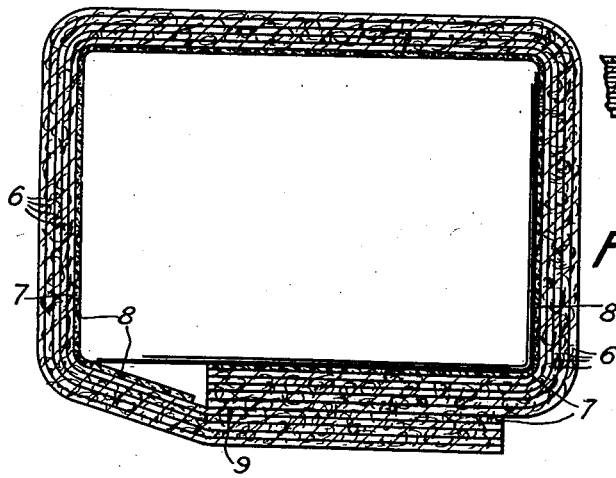
Figure 2 is a detail section of another form of material in accordance with the invention, in use as a wrapping.

A satisfactory form of liner embodying these principles is shown in Figure 2 and is made up as follows.

a. A layer five or six sheets thick of cellulose wadding 6, 7 with the outer four sheets 6 (or all sheets) impregnated with DDT at a concentration of approximately 1 per cent by weight.

b. An inner lining 8 of thin paper to protect the cellulose wadding during packing.

c. The portions of the liner which are to overlap when the package is closed have the inner protective sheet of paper removed from the outer overlapped margin as at 9 so that for a distance of at least one inch the overlap is wadding to wadding.

d. All joints can be overlapped in this way but it is more convenient if the bottom and side joints are stitched or otherwise secured, the inner paper being removed at each such joint.

As an alternative it is sometimes more convenient to make the liner in this way without an inner paper layer and to insert a separately made paper lining as a protection to the wadding.

Where the weight of the contents of the package rests on the protective wadding the latter is compressed so that free space for insects to congregate in is not available but in practice this does not matter because insects are found always to enter a package at a point where it is not in pressure contact with other solid materials. If the package is moved so that weight no longer falls on the side originally compressed cellulose wadding will spring into a loose condition again. It is important that whatever material is used the elasticity must be sufficient to restore the original loose state after pressure is removed.

Figure 3:
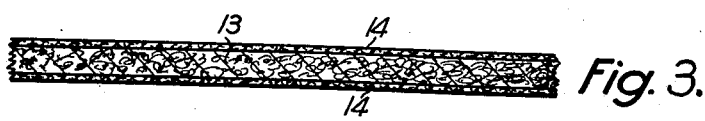
Figures 3 and 4 show modifications of the arrangements of Figures 1 and 2.
Figure 4:

Modifications of the packaging material are shown in Figures 3 and 4. In Figure 3 a layer 13 of wood wool or cotton wool is sandwiched between two layers 14 of paper and in Figure 4 a layer 20 of wood wool or cotton wool is held by adhesive to a single layer 21 of paper or card.

In the case of the material shown in Figure 3 the size of the passages formed in the material by the juxtaposition of the sheets should be related to the size of insects and this form is not so useful where insects of different sizes have to be provided against.

We claim:

1. An insect-destroying packaging material including at least one labyrinthine layer of cellulose wadding impregnated with an insecticide whereby to cause insects to follow a tortuous path at least through said material and to pick up a lethal dose of the insecticide, and a thin supporting sheet of flexible material on at least one side of said layer.

2. An insect-destroying packaging material as claimed in claim 1 having a plurality of said layers.

3. An insect-destroying packaging material as claimed in claim 1 having a plurality of said layers of which only some are impregnated with the insecticide.

4. An insect-destroying packaging material as claimed in claim 1 having a plurality of said layers of which only the middle layers are impregnated with the insecticide.

5. An insect-destroying packaging material as claimed in claim 1 supported on both sides by the said thin sheets.

6. An insect-destroying packaging material as claimed in claim 1 wherein the said thin sheet is of paper.

7. An insect-destroying packaging material as claimed in claim 1 wherein the said thin sheet is of card.

8. An insect-destroying packaging material as claimed in claim 1 wherein the insecticide is DDT.

9. An insect-destroying packing material as claimed in claim 1 wherein the insecticide is DDT at a concentration of approximately 1% by weight.

10. A packaging material comprising a layer of cellulose wadding of five to six sheets thick of which at least the outer four layers are impregnated with DDT at a concentration of approximately 1% by weight, and an inner layer of thin paper.

11. A package incorporating a wrapping of the material claimed in claim 10, the edges of the wrapping being overlapped at at least one of the joints and the thin paper being removed from sufficient of the outer overlapped margin to provide a wadding to wadding overlap of at least one inch in width.

12. A package incorporating a lining of the material claimed in claim 10, the edges of the wrapping being overlapped at at least one of the joints and the thin paper being removed from sufficient of the outer overlapped margin to provide a wadding to wadding overlap of at least one inch in width.

GEOFFREY VERNON BROOKE HERFORD.
THOMAS ALAN OXLEY.

REFERENCES CITED

The following references are of record in the file of this patent:

UNITED STATES PATENTS

| Number | Name | Date |
|---|---|---|
| 1,637,362 | Tupper | Aug. 2, 1927 |
| 1,899,892 | D'Este et al. | Feb. 28, 1933 |
| 1,993,394 | Bangs et al. | Mar. 5, 1935 |
| 2,427,647 | Vahlteich | Sept. 16, 1947 |

FOREIGN PATENTS

| Number | Country | Date |
|---|---|---|
| 28,531 | Great Britain | 1896 |